United States Patent [19]
Futschik et al.

[11] Patent Number: 5,941,604
[45] Date of Patent: Aug. 24, 1999

[54] SHOULDER BELT DEFLECTOR WITH INTEGRATED SEATBACK RELEASE

[75] Inventors: Hans-Dieter Futschik, Gechingen; Norbert Weber, Bondorf; Karl-Heinz Naegele, Gaeufelden, all of Germany

[73] Assignee: Daimler-Benz Aktiengesellschaft, Stuttgart, Germany

[21] Appl. No.: 09/071,496

[22] Filed: May 4, 1998

[30] Foreign Application Priority Data

May 2, 1997 [DE] Germany ............... 197 18 519
Oct. 22, 1997 [DE] Germany ............... 197 46 571

[51] Int. Cl.[6] .................................................. A47C 31/00
[52] U.S. Cl. ........................................... 297/473; 297/483
[58] Field of Search ................................ 297/473, 468, 297/464, 378.1, 483; 280/801.1

[56] References Cited

U.S. PATENT DOCUMENTS

| | | |
|---|---|---|
| 4,652,053 | 3/1987 | Mikami . |
| 5,263,741 | 11/1993 | Seros et al. . |
| 5,358,310 | 10/1994 | Nemote . |
| 5,660,444 | 8/1997 | Thomas . |
| 5,681,081 | 10/1997 | Lindner et al. . |
| 5,722,731 | 3/1998 | Chang . |
| 5,730,499 | 3/1998 | Salisbury, Jr. . |
| 5,733,013 | 3/1998 | Brown . |

FOREIGN PATENT DOCUMENTS

| | | |
|---|---|---|
| 0 808 745 A1 | 11/1997 | European Pat. Off. . |
| 42 11 471 A1 | 4/1991 | Germany . |
| 42 11 471 C2 | 1/1999 | Germany . |

*Primary Examiner*—Milton Nelson, Jr.
*Attorney, Agent, or Firm*—Evenson, McKeown Edwards & Lenahan P.L.L.C.

[57] ABSTRACT

A car seat is provided with fold-down seatbacks and an associated safety-belt system. The shoulder belt of the safety-belt system in the upper corner of the seatback from the direction of the outside of the car, exits through a slot-like opening of a covering on the seatback in the direction of the belt user, and a seatback release is arranged at a distance from the safety-belt deflector. So that the seatback release does not have to be configured and built individually for car seats of the most varied kinds, a unit which is mountable on the contour of the seatback and accommodates the belt deflector and the seatback release, is prefabricated as an assembly unit.

5 Claims, 4 Drawing Sheets

SHOULDER BELT DEFLECTOR WITH INTEGRATED SEATBACK RELEASE

BACKGROUND AND SUMMARY OF THE INVENTION

This application claims the priority of German application Nos. 197 18 519.3 and 197 46 571.4, filed May 2, 1997 and Oct. 22, 1997, respectively, the disclosures of which are expressly incorporated by reference herein.

The present invention relates to a car seat with fold-down seatbacks and an associated safety-belt system, the shoulder belt of which, in the upper corner of the seatback from the direction of the outside of the car, exits through a slot-like opening of a covering on the seatback in the direction of the belt user, and a seatback release arranged at a distance from the safety-belt deflector.

Such a seatback is described in DE 42 11 471 C2. There, an opening is arranged in the upper corner of the seatback, with a covering through which a shoulder belt is guided. The covering is an essentially plate-like component with a slot-like opening, mounted on bearings so it can pivot. Thereby, when the safety belt is used by persons of different size and height, the course of the belt can be better adapted to requirements. The known seatback release is formed as a notch lever on the outside of the seatback at a substantial distance from the covering. This embodiment, with its widely-separated functional parts, is very expensive and intensive in terms of assembly.

An object of the present invention is to provide an improved shoulder-belt passage and operation of the seatback release with a car seat such that, while retaining the required functionality, an attractive, easily-mountable functional group is achieved.

This object has been achieved according to the present invention with a car seat in which the covering together with the base frame accepting it on the upper corner of the seatback can be mounted as a unit and consists of two cover parts blending together on the exterior, of which the first cover part is formed as a hood-shaped cover covering the belt deflector and the second cover part, connected therewith, is formed by a recessed grip that can be pivoted forward in relation to the first cover part, so as to release the seatback.

Advantageously, only one functional unit is used on the outside of the seatback, accommodating the belt deflector and the seatback release, and which appears, from the outside, as one part. This functional unit is usable for any type of seat and requires only a minor expenditure to adapt it to the various types of car seats.

The use of a base frame advantageously allows the various cover parts on it to be combined into a prefabricated assembly unit and to be attached to the outside of the seat by snap-in or screw connection.

For better operation, the second cover part is provided with a recessed grip so that the flexible traction mechanism hung on the inside, used for the seat release, can be operated with certainty.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
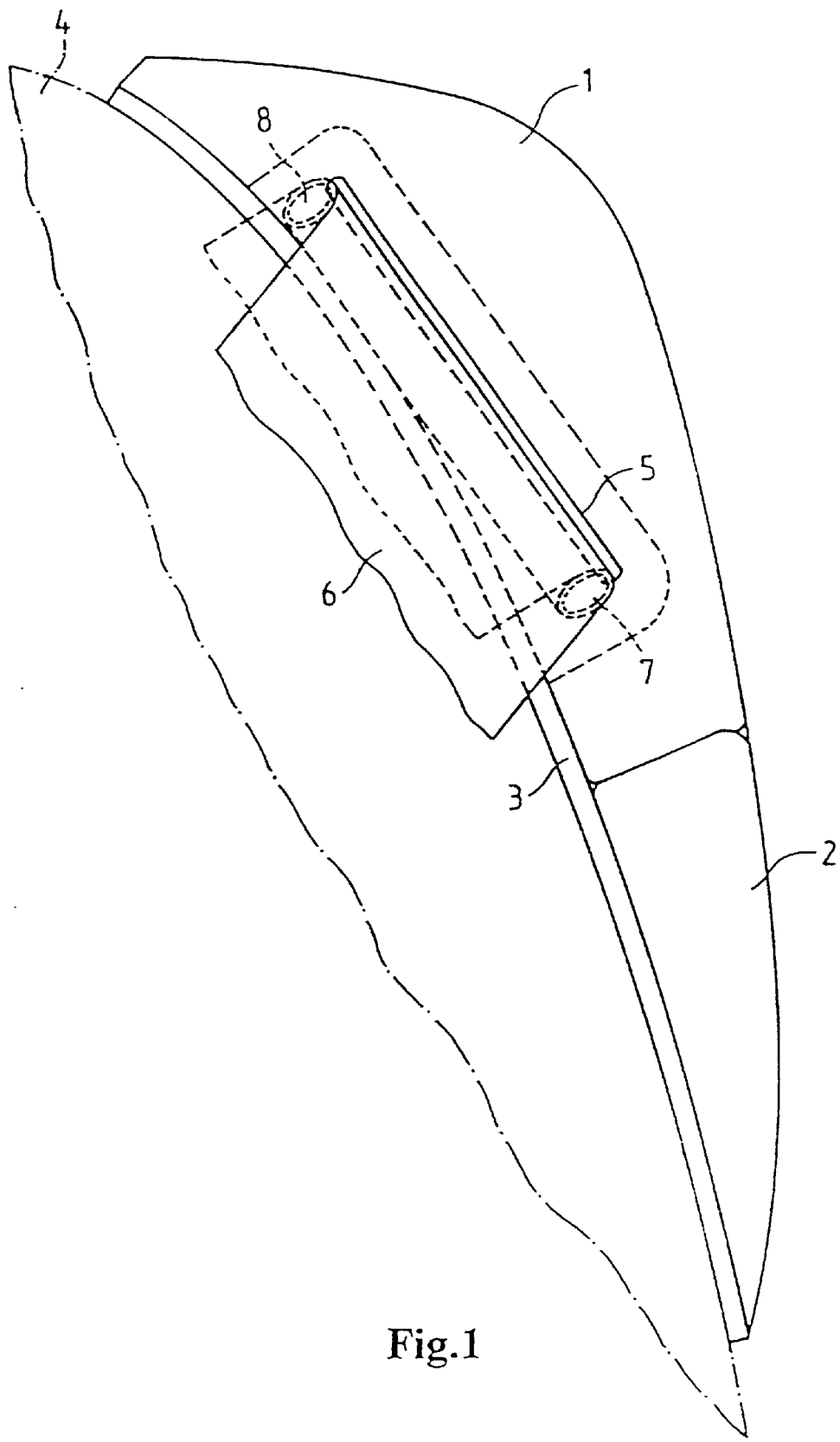
FIG. 1 is a front view of the modular unit with the shoulder belt exiting therefrom toward the belt user.

FIG. 1 shows a unit consisting of first cover part 1 and second cover part 2 that are arranged on base frame 3. Base frame 3 is, in turn, attached to upper seatback frame 4 by a known type of snap-in or screw connection. Slot-like opening 5 is provided in the first cover part 1, through which safety belt 6 is guided and runs over a deflection rail, slide rail or deflection pulley 7, which is connected with base frame 3 by bracket 8. The first cover part 1 is shaped like a hood and covers the deflection rail, sliding rail or deflection pulley 7 so that only the safety belt 6, producing the connection to the belt lock, visibly protrudes therefrom. The second cover part 2 connects to the first cover part 1 and appears as an exterior second cover part 2 and accepts the contact surfaces of first cover part 1, blending therewith while also serving as the hand grip for the seatback release.

Figure 2:
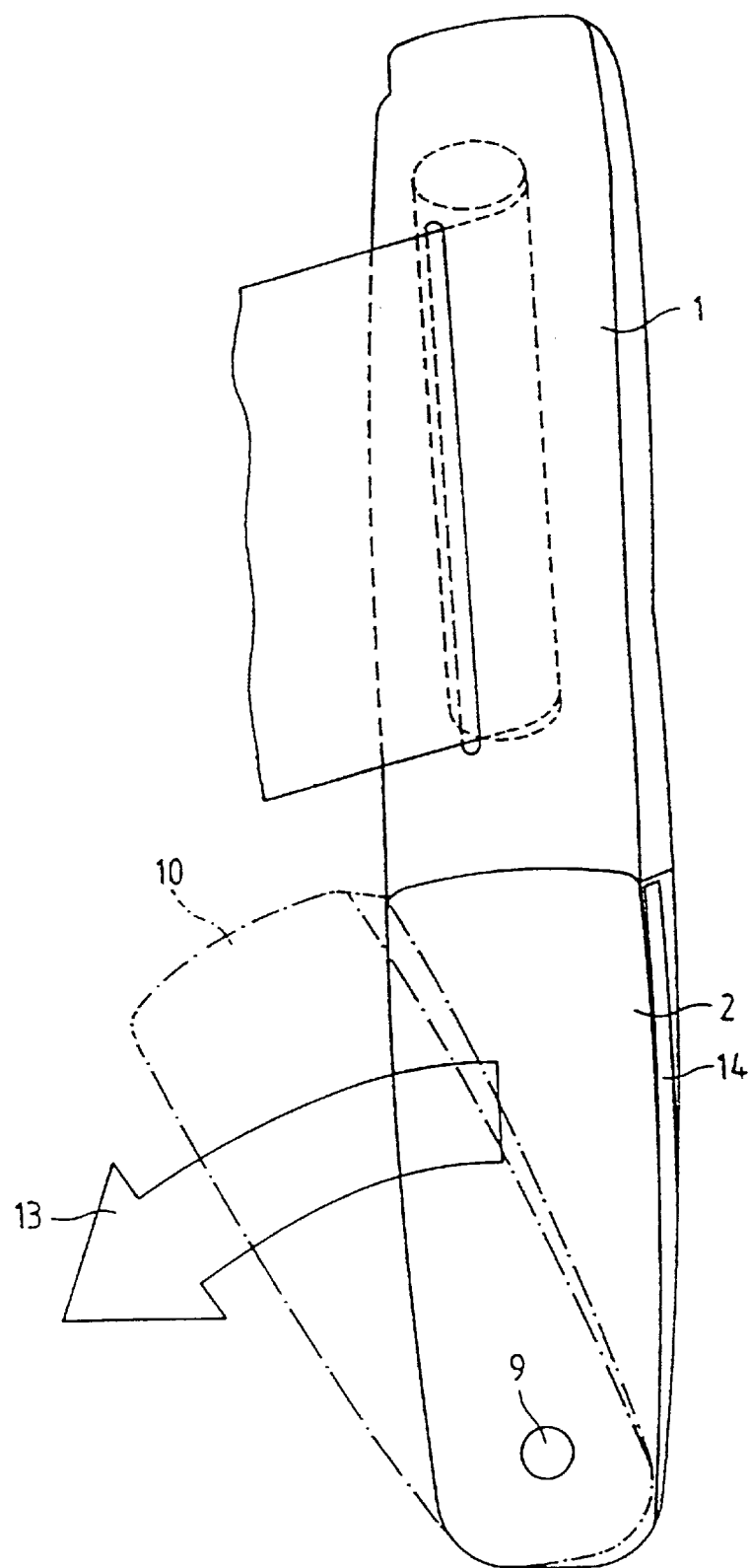
FIG. 2 is a side view of the modular unit of FIG. 1.
Figure 3:
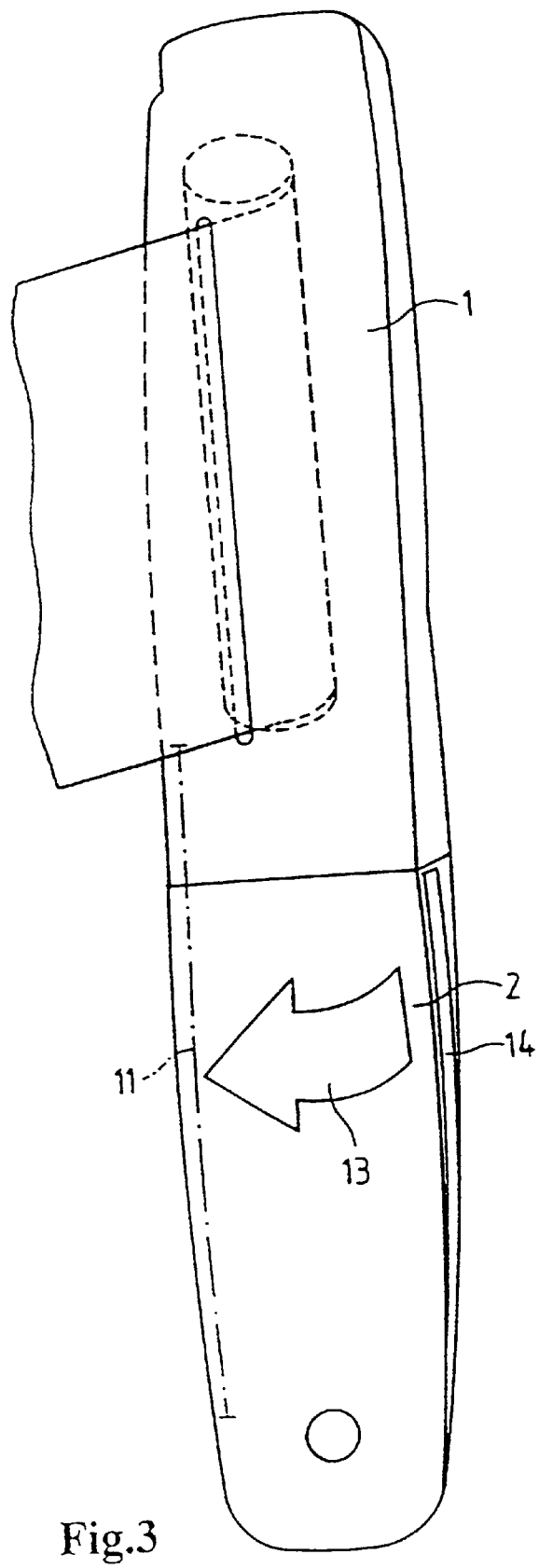
FIG. 3 is a side view of the arrangement of the vertical fulcrum pin.

The cover parts 1, 2 can be seen in FIG. 2. In the first cover part 1, the deflection pulley 7 is shown schematically with safety belt 6. The second cover part 2 can be pivoted around a swivel pin 9 in the direction of the broad arrow and is provided with radius 10, in the direction of the first cover part 1 to guarantee a sure fit with the first cover part 1. The fulcrum pin 9 is connected with the base frame 3. FIG. 3 shows an alternative arrangement, in which the swivel pin 11 is placed in a vertical direction, and the second cover part 2 can be pivoted around this swivel pin 11 to actuate the seatback release.

Figure 4:
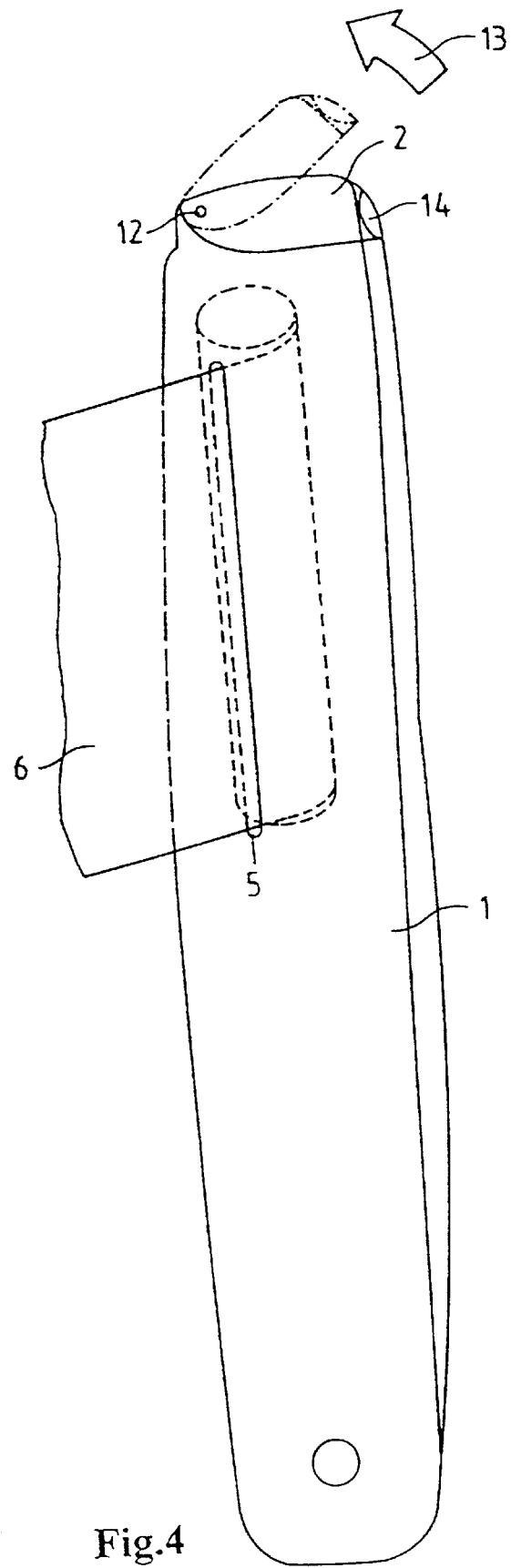
FIG. 4 is a side view of an embodiment with the seat release grip placed at the top of the unit.

In the embodiment of FIG. 4, which corresponds, in terms of function and arrangement, to the seatback (not shown) in the method of embodiment of FIG. 1, the second cover part 2 is placed above the first cover part 1 which has a slot-like opening 5 for the safety belt 6. The second cover part 2, serving to actuate the seatback release, can be pivoted forward around a swivel pin 12 corresponding to broad arrow 13, while a recessed grip 14 guarantees better operation. The other above-described embodiments can also have the recessed grips 14 as shown in FIGS. 2 and 3. In these embodiments, the arrow 13 is also shown, in the direction of which the second cover part 2 can be pivoted to actuate the seatback release.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat with a fold-down seatback and an associated safety-belt system having a shoulder belt which, in an upper corner of the seatback from a direction of a vehicle outside, exits through a slotted opening in a covering on the seatback in a direction of a belt user, and a seatback release arranged at a distance from a safety-belt deflector, wherein the covering and a base frame accepting the covering on the upper corner of the seatback are mountable as a unit and said covering includes a first and second cover part blending together on the exterior, of which the first cover part is a hood-shaped cover covering the belt deflector and the second cover part, connected therewith, is a recessed grip which is pivotably mounted forward in relation to the first cover part so as to release the seatback.

2. The vehicle seat of claim 1, wherein the base frame is configured to constitute storage for the second cover part.

3. The vehicle seat of claim 2, wherein the second cover is configured as a grip and is provided, on a side thereof opposite an end of the second cover part with a swivel pin, with a recessed grip.

4. The vehicle seat of claim 3, wherein an interior fixed flexible traction mechanism is arranged to lead away from the second cover part to transfer a release movement.

5. The vehicle seat of claim 1, wherein the base frame and the cover parts constitute a prefabricated assembly unit adapted to outside contours of the seat back.

* * * * *

UNITED STATES PATENT AND TRADEMARK OFFICE
Certiicate

Patent No. 5,941,604                                                 Patented: August 24, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hans-Dieter Futschik, Norbert Weber, Karl-Heinz Naegele, Peter Horn, Albrecht Schneckenburger, Bernd Schmidt and Holger Hultzenlaub.

Signed and Sealed this Twenty-Eighth Day of November, 2000.

<div style="text-align: right;">
PETER M. CUOMO<br>
<i>Supervisory Patent Examiner</i><br>
Art Unit 3636
</div>